United States Patent [19]

Segal

[11] Patent Number: 5,736,933

[45] Date of Patent: Apr. 7, 1998

[54] METHOD AND APPARATUS FOR PROVIDING REDUNDANCY IN A COMMUNICATION NETWORK

[75] Inventor: Niranjan Nath Segal, Arlington, Tex.

[73] Assignee: Motorola, Inc., Schaumburg, Ill.

[21] Appl. No.: 608,020

[22] Filed: Mar. 4, 1996

[51] Int. Cl.$^6$ .............. H04J 3/16; G06F 11/20; H04B 7/212; H04B 7/00

[52] U.S. Cl. .............. 340/825.44; 340/825.16; 370/351; 370/400; 364/242.94; 364/243; 364/242.96; 395/200.1; 395/200.02

[58] Field of Search ............. 340/825.44, 825.16; 364/242.94, 243, 284.4, 229, 242.96; 370/351, 400, 401; 395/200.1, 200.02

[56] References Cited

U.S. PATENT DOCUMENTS

| | | | |
|---|---|---|---|
| 4,527,270 | 7/1985 | Sweeton | 371/11 |
| 4,654,654 | 3/1987 | Butler et al. | 340/825.5 |
| 4,780,873 | 10/1988 | Mattheyses | 370/400 |
| 5,051,740 | 9/1991 | Barr | 340/825.44 |
| 5,537,414 | 7/1996 | Takiyasu et al. | 370/95.1 |
| 5,543,785 | 8/1996 | Vatt et al. | 340/825.44 |
| 5,566,173 | 10/1996 | Steinbrecher | 370/400 |

OTHER PUBLICATIONS

"M15 Paging System Overview", by Motorola, #6880451f35–O, Section 6, pp. 6–1 to 6–5, Dec. 1995.

*Primary Examiner*—Michael Horabik
*Assistant Examiner*—Yonel Beaulieu
*Attorney, Agent, or Firm*—R. Louis Breeden

[57] ABSTRACT

Redundancy is provided in a communication network including a plurality of nodes (114, 112, 106, 102) by a first node (114) receiving and storing (402) a message (210) in a first memory (202). The first node then transmits (404) the message to a first one of a plurality of second nodes (112), and removes (412) the message from the first memory after receiving an acknowledgment from any one of the plurality of second nodes. The first one of the plurality of second nodes receives (502) and stores (504) the message within a second memory (302) and stores (506) the message within a third memory (110) accessible to the plurality of second nodes. The first one of the plurality of second nodes transmits (508) the acknowledgment to the first node after storing the message in both the second and third memories.

12 Claims, 6 Drawing Sheets

METHOD AND APPARATUS FOR PROVIDING REDUNDANCY IN A COMMUNICATION NETWORK

FIELD OF THE INVENTION

This invention relates in general to communication networks, and more specifically to a method and apparatus for providing redundancy in a communication network.

BACKGROUND OF THE INVENTION

Communication networks utilized in high availability communication systems, such as selective call messaging systems, have employed various approaches to redundancy. One approach has been to duplicate essential elements of the system and to provide some form of redundancy switching to isolate a failed element. This approach has proved expensive and has required rather complex software to control the switching, fault recovery, and isolation. In addition, the approach has required synchronization of duplicate databases containing duplicate copies of the messages in transit through the communication network in each of the essential elements of the system. The duplication of data in large, real-time systems has placed an extraordinary load on the communication channels carrying the data between the input nodes and the output nodes.

What is needed is a method and apparatus for providing redundancy in such communication networks without the problems that have accompanied prior art approaches. A solution is needed that does not require duplicate, synchronized databases in each of the essential elements of the network. An approach is needed that does not require redundancy switching and complex software therefor. A method and apparatus is needed that does not place an extraordinary load on the communication channels carrying the data between the input nodes and the output nodes.

SUMMARY OF THE INVENTION

An aspect of the present invention is a method for providing redundancy in a communication network comprising a plurality of nodes, the method comprising at a first node the steps of receiving and storing a message in a first memory, transmitting the message to a first one of a plurality of second nodes, and removing the message from the first memory, in response to receiving an acknowledgment from any one of the plurality of second nodes. The method further comprises at the first one of the plurality of second nodes the steps of receiving and storing the message within a second memory, storing the message within a third memory accessible to the plurality of second nodes, and transmitting the acknowledgment to the first node, in response to storing the message in both the second and third memories.

Another aspect of the present invention is a method for providing redundancy in a communication network comprising a plurality of nodes that are communicating with a portable subscriber unit. The method comprises at an input node the steps of receiving and storing a message in a first memory, and transmitting the message via a first transmission path of the communication network to the portable subscriber unit. The method further comprises the steps of receiving an end-to-end acknowledgment from the portable subscriber unit, and removing the message from the first memory, in response to receiving the end-to-end acknowledgment.

A third aspect of the present invention is a communication network having a plurality of nodes for providing redundancy, the communication network comprising a first node for receiving and storing a message. The first node comprises a communication interface for receiving the message and for transmitting the message to a first one of a plurality of second nodes, a first memory coupled to the communication interface for storing the message, and a first processor coupled to the first memory and coupled to the first communication interface for removing the message from the first memory, in response to receiving by the first communication interface an acknowledgment from any one of the plurality of second nodes. The communication network further comprises the first one of the plurality of second nodes, which comprises a second communication interface coupled to the first communication interface for receiving the message, a second memory coupled to the second communication interface for storing the message, and a second processor coupled to the second communication interface for transmitting the acknowledgment to the first node, in response to storing the message both in the second memory and in a third memory. The communication network also includes the third memory coupled to the plurality of second nodes for storing the message.

A fourth aspect of the present invention is a communication network having a plurality of nodes for providing redundancy while communicating with a portable subscriber unit. The communication network comprises an input node for receiving and storing a message. The input node comprises a communication interface for receiving the message and for transmitting the message via a first transmission path of the communication network to the portable subscriber unit, and a memory coupled to the communication interface for storing the message. The input node further comprises a processor coupled to the communication interface for receiving an end-to-end acknowledgment from the portable subscriber unit through the communication network. The processor is programmed to remove the message from the memory, in response to receiving the end-to-end acknowledgment.

DESCRIPTION OF THE PREFERRED EMBODIMENT

Figure 1:
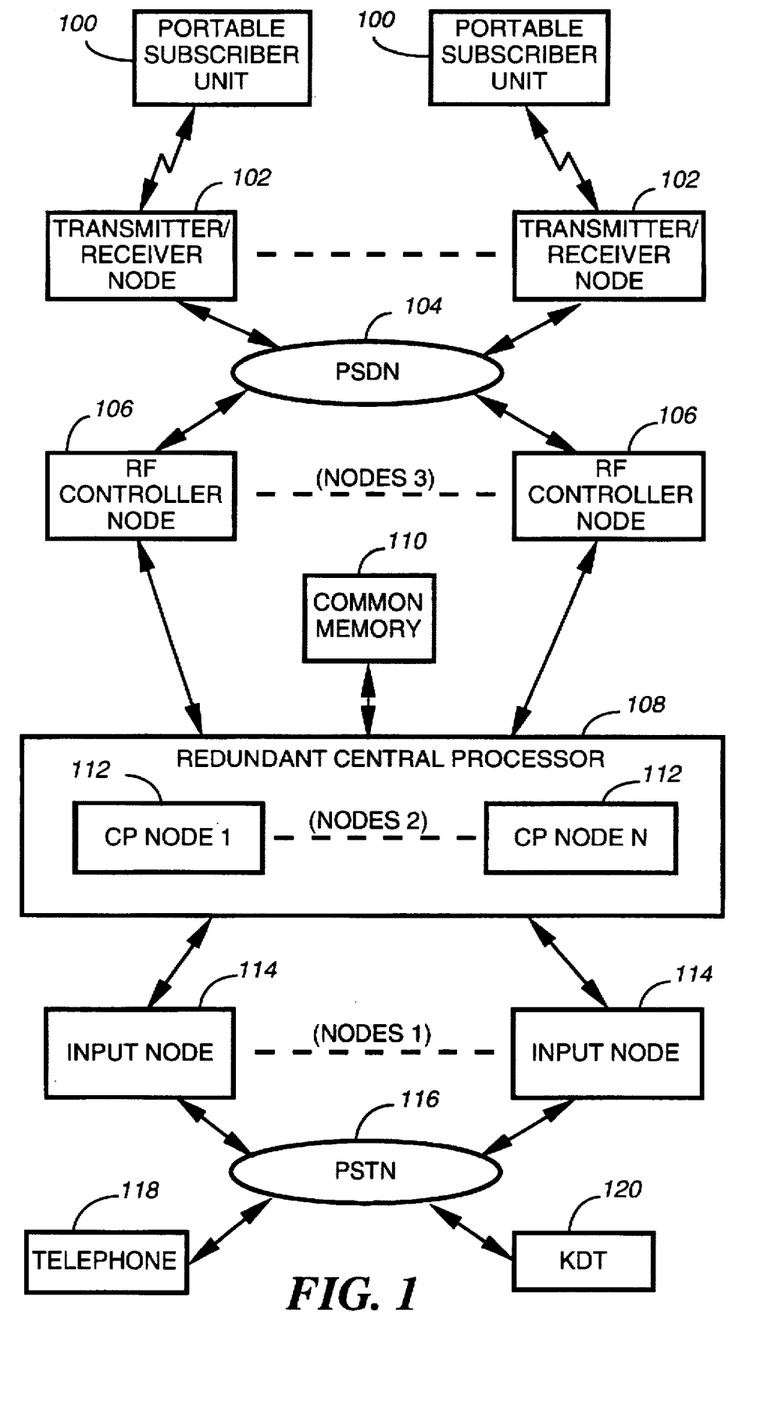
FIG. 1 is an electrical block diagram of a communication network in accordance with the present invention.

With reference to FIG. 1, an electrical block diagram of a communication network in accordance with the present invention includes a plurality of input nodes 114 coupled to a redundant central processor (CP) 108 comprising a plurality of CP nodes 112. The plurality of input nodes 114 are also coupled to a public switched telephone network (PSTN) for receiving messages therefrom. The messages are originated from various input devices, such as a conventional telephone 118 and a conventional keyboard/display terminal (KDT) 120. The redundant CP 108 is coupled to a common memory 110 accessible by the plurality of CP nodes 112. The redundant CP 108 is also coupled to a plurality of radio frequency (RF) controller nodes 106. The plurality of RF controller nodes 106 are coupled to a plurality of transmitter/receiver nodes 102 through a public switched data network (PSDN), or, alternatively, through some other interconnection means, e.g., dedicated wireline, satellite, or RF link. The plurality of transmitter/receiver nodes 102 communicate by conventional RF signals with a plurality of conventional portable subscriber units 100. As configured in FIG. 1, the communication network forms a selective call radio communication system. It will be appreciated that in alternative configurations the communication network can form other types of systems, e.g., a data packet network.

The hardware of each of the plurality of CP nodes 112 is preferably similar to the Wireless Messaging Gateway (WMG™) Administrator! central processor, and each of the plurality of RF controller nodes 106 is preferably similar to the RF-Conductor!™ message distributor. The hardware of each of the plurality of input nodes 114 is preferably similar to the Universal Communications Controller (UCC) compatible with the (WMG™) Administrator! central processor. The plurality of transmitter/receiver nodes 102 are preferably similar to Nucleus® Orchestra! transmitter/receivers. The plurality of conventional portable subscriber units 100 are preferably similar to Tango™ acknowledge-back selective call receivers. All of the preceding equipment is manufactured by Motorola, Inc. of Schaumburg, Ill. The common memory 110 is preferably a conventional magnetic disk memory. It will be appreciated that other similar equipment can be utilized as well for the CP nodes 112, RF controller nodes 106, input nodes 114, transmitter/receiver nodes 102, portable subscriber units 100, and the common memory 110.

Preferably, redundancy is achieved in the redundant CP 108 by having the plurality of CP nodes 112 communicate with one another and with the common memory 110 via at least one local area network (LAN) using a well-known data communication protocol. By communicating with one another, the plurality of CP nodes 112 can monitor the operational status of each other and can assume responsibility for sending a failed CP node's unsent messages in accordance with the present invention, as described herein below.

In brief, a caller, using, for example, the telephone 118, originates a message intended for one of the portable subscriber units 100. The message is received by one of the input nodes 114 using techniques well known in the art. The input node 114 then passes the message to the redundant CP 108, which queues the message for transmission to at least one of the RF controller nodes 106 for distribution to the appropriate transmitter/receiver nodes 102. Voice, data and control transmissions between the transmitter/receiver nodes 102 and the portable subscriber units 100 preferably utilize a well-known protocol such as the REFLEX™ digital selective call signaling protocol developed by Motorola, Inc. It will be appreciated that, alternatively, other communication protocols can be used as well.

Figure 2:
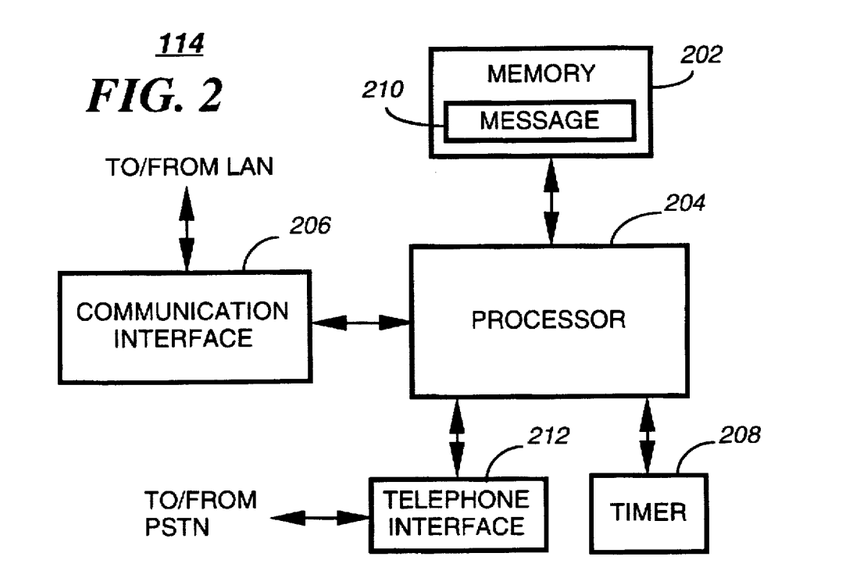
FIG. 2 is an electrical block diagram of an input node of the communication network in accordance with the present invention.

FIG. 2 is an electrical block diagram of one of the input nodes 114 of the communication network in accordance with the present invention. The input node 114 comprises a processor 204 for controlling the operations of the input node 114. The processor 204 is coupled to a conventional telephone interface 212 for receiving a message 210 from the PSTN. The processor 204 is also coupled to a conventional memory 202 for storing the message 210. The processor is further coupled to a conventional communication interface 206 for communicating with the CP nodes 112 to send the message and to receive an acknowledgment via the at least one LAN shared by the input nodes 114 and the CP nodes 112. In addition, the processor 204 is coupled to a conventional timer 208 for timing certain events, as will be described below. The processor 204 is programmed by way of the memory 202 for operating in accordance with the present invention. It will be appreciated that, alternatively, a single communication interface can handle the duties of both the telephone interface 212 and the communication interface 206 for both receiving the message from the PSTN and for communicating with the CP nodes 112.

Figure 3:
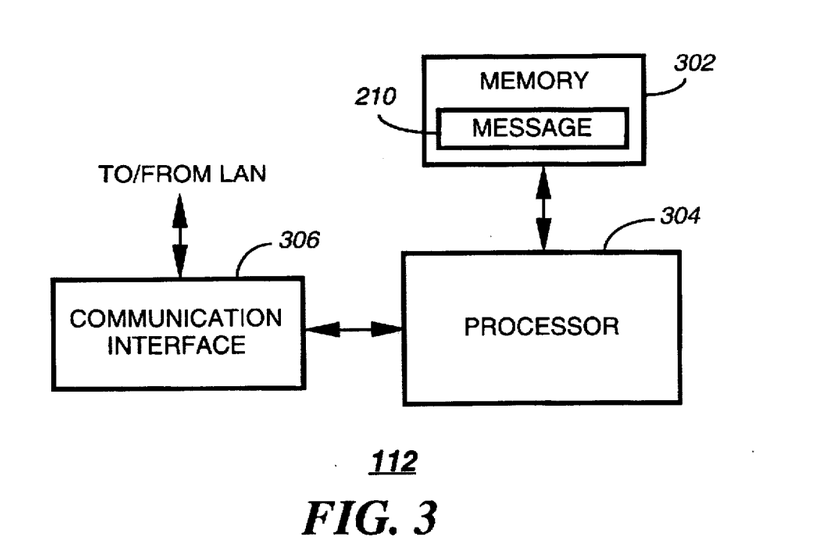
FIG. 3 is an electrical block diagram of a central processor node of the communication network in accordance with the present invention.

FIG. 3 is an electrical block diagram of one of the CP nodes 112 of the communication network in accordance with the present invention. The CP node 112 comprises a processor 304 for controlling the operations of the CP node 112. The processor 304 is coupled to a communication interface 306 for communicating with the input nodes 114 and the RF controller nodes 106 via the at least one LAN. The processor 304 is also coupled to a memory 302 for storing the message 210 and for programming the processor 304 in accordance with the present invention.

Figure 4:
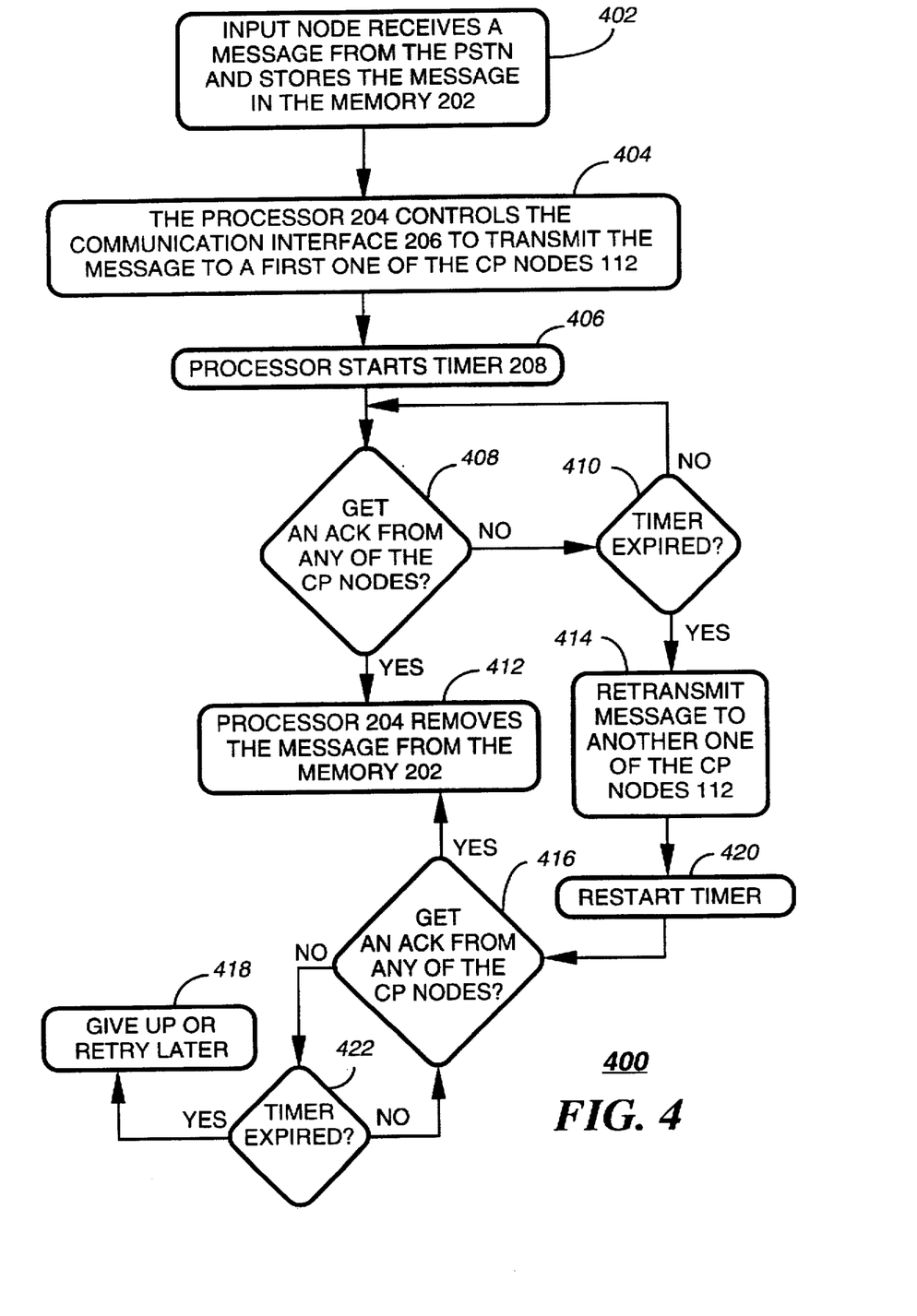
FIG. 4 is a flow chart depicting operation of the input nodes of the communication network in accordance with a first embodiment of the present invention.

FIG. 4 is a flow chart 400 depicting operation of the input nodes 114 of the communication network in accordance with a first embodiment of the present invention. In step 402 the input node 114 receives a message 210 from the PSTN and stores the message 210 in the memory 202. In response, the processor 204 controls the communication interface 206 to transmit 404 the message 210 via the at least one LAN to a first one of the CP nodes 112. In addition, the processor 204 starts 406 the timer 208. Next, the processor 204 loops between steps 408 and 410 to determine whether an acknowledgment from any one of the CP nodes 112 is received before the timer 208 reaches a predetermined time limit. If the acknowledgment is received before the timer 208 reaches the limit, then the processor 204 removes 412 the message 210 from the memory 202. If, on the other hand, the timer 208 reaches the limit before the acknowledgment is received, then the processor 204 retransmits 414 the message 210 to a second one of the CP nodes 112 and restarts 420 the timer 208. Next, the processor 204 loops between steps 416 and 422 to determine whether an acknowledgment from any one of the CP nodes 112 is received before the timer 208 reaches a predetermined time limit. If the acknowledgment is received before the timer 208 reaches the limit, then the processor 204 removes 412 the message 210 from the memory 202. If, on the other hand, the timer 208 reaches the limit before the acknowledgment is received, then the processor 204 gives up 418, or alternatively, can reschedule a retry for a later time. By performing as described above, the input nodes 114 advantageously function to prevent the message 210 from being lost in the event of a failure of a CP node 112 (or a portion of the LAN) to which the message 210 has been sent.

Figure 5:
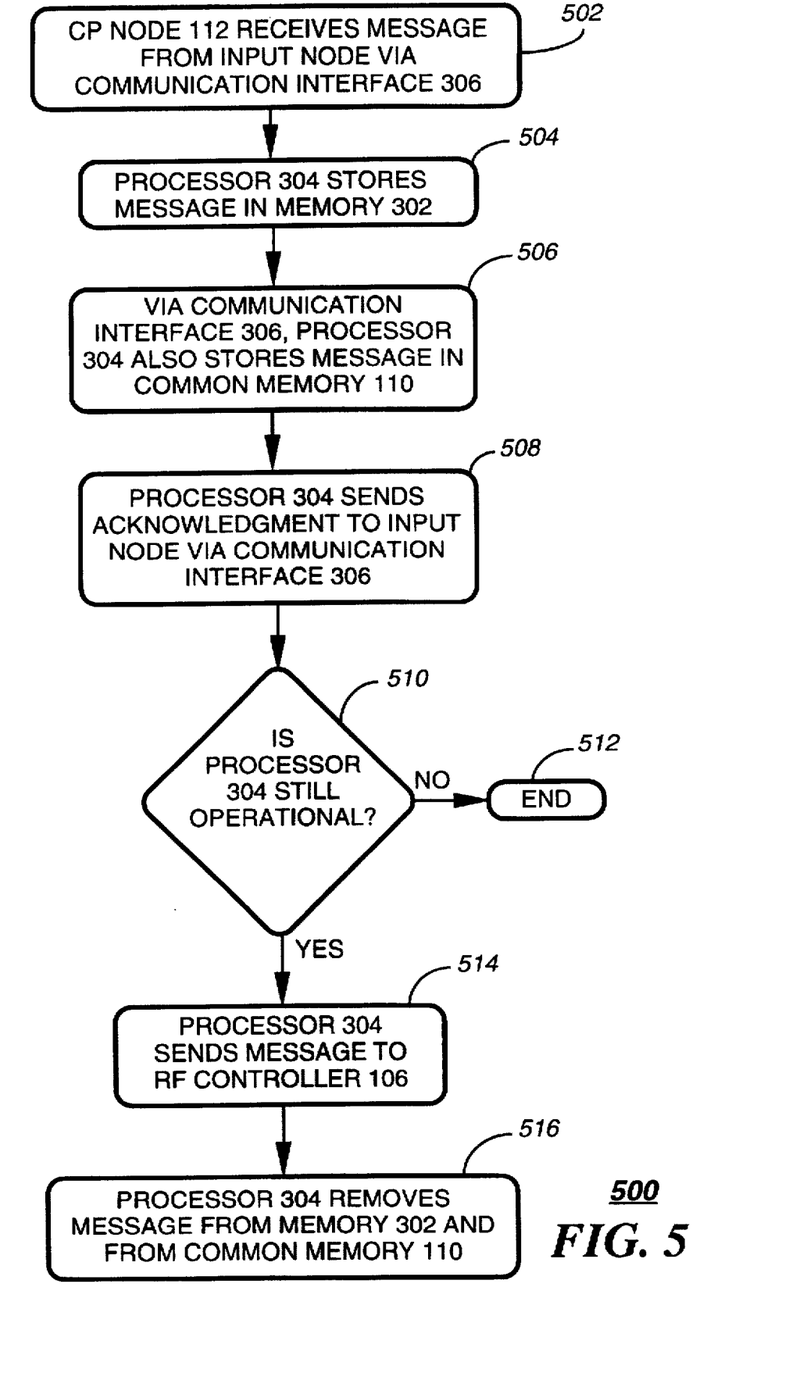
FIGS. 5 and 6 are flow charts depicting operation of the central processor nodes of the communication network in accordance with the first embodiment of the present invention.
Figure 6:
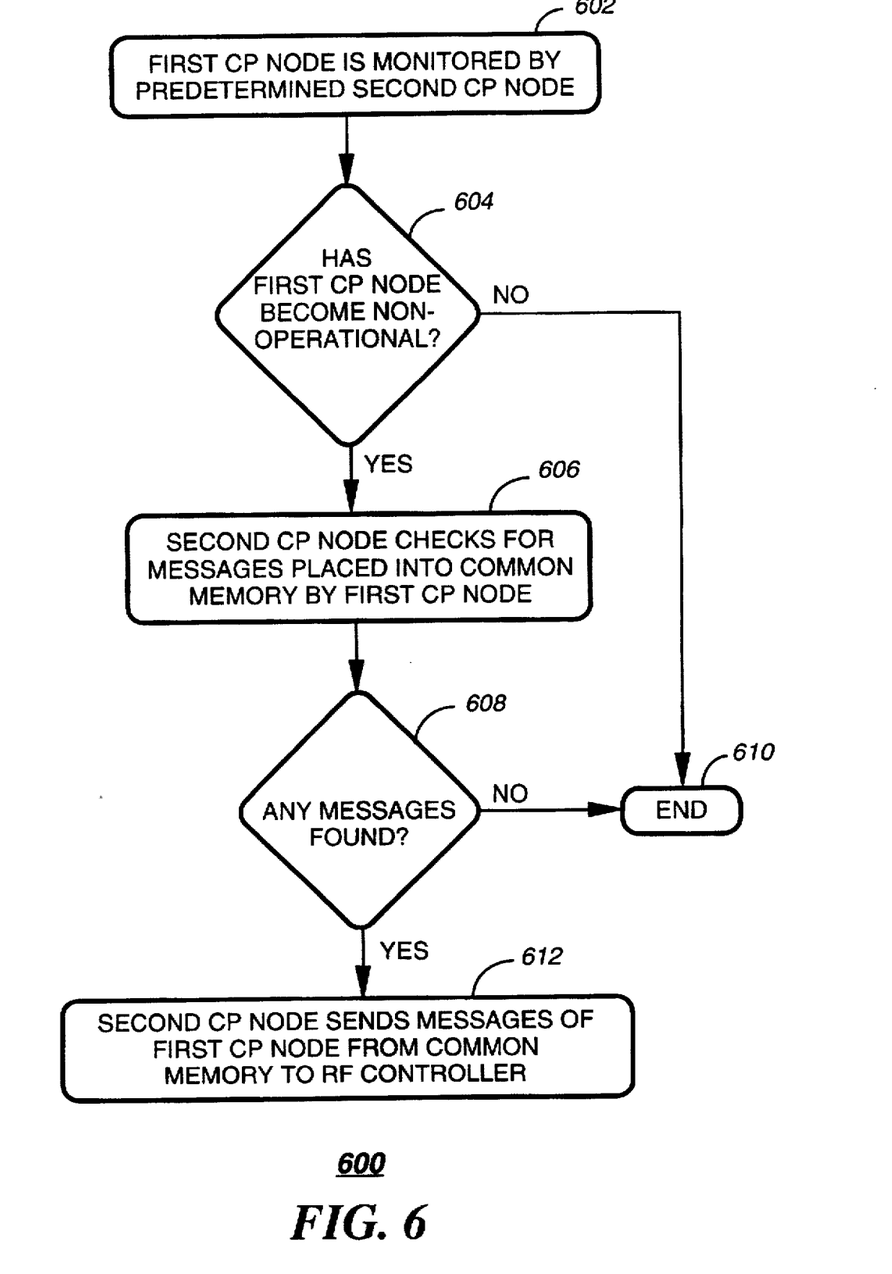

FIGS. 5 and 6 are flow charts 500, 600 depicting operation of the CP nodes 112 of the communication network in accordance with the first embodiment of the present invention. FIG. 5 describes normal operation of a CP node 112 when there is not a failure therein. In step 502, one of the CP nodes 112 receives the message 210 from one of the input nodes 114 via the communication interface 306. The processor 304 then stores 504 the message 210 in the memory 302. Via the communication interface 306 and the at least one LAN, the processor 304 also stores 506 the message 210 in the common memory 110 in a manner that associates the message 210 with the particular processor 304 that is performing the storing. To associate the particular processor 304 with the message 210, the processor 304 can, for example, store the message 210 in an area of the common memory 110 assigned exclusively to the particular processor 304. The processor 304 then sends 508 an acknowledgment to the input node 114 via the communication interface 306 and the at least one LAN. In step 510, should the processor 304 fail before sending the message, nothing further will happen at this particular CP node 112. On the other hand, if the processor 304 remains operational, it sends 514 the message 210 to at least one of the RF controller nodes 106 for distribution to the appropriate transmitter/receiver nodes 102. After sending the message 210, the processor 304 removes the message 210 from the memory 302 and from the common memory 110.

FIG. 6 describes interaction between the CP nodes 112 to recover messages after a failure of one of the CP nodes 112. In step 602 the first CP node 112 is monitored by a predetermined second CP node 112. In step 604 if the second CP node 112 continues to receive periodic operational status indications, i.e., "handshakes", from the first CP node 112 indicating that the first CP node 112 is operational, then the second CP node 112 has no further action to take. On the other hand, if the periodic handshakes stop, indicating that the first CP node 112 has apparently become non-operational, then the second CP node 112 checks for any messages associated with the first CP node 112 in the common memory 110. If any such messages are found 608, the second CP node 112 sends the messages to at least one of the RF controller nodes 106 for distribution to the appropriate transmitter/receiver nodes 102. By performing as described above, the CP nodes 112 advantageously interact with one another to prevent messages from being lost in the event of a failure of one of the CP nodes 112.

Figure 7:
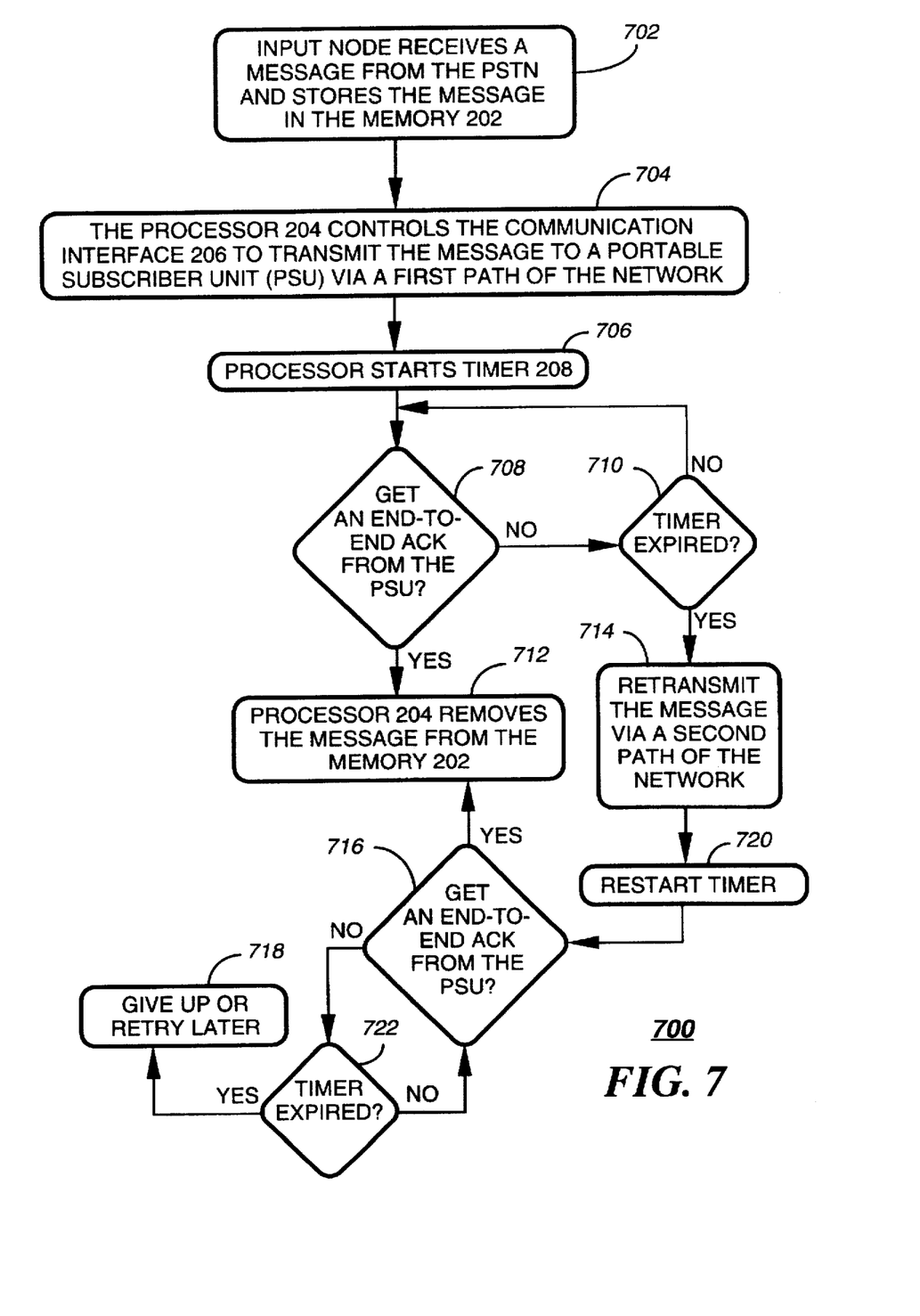
FIG. 7 is a flow chart depicting operation of the input nodes of the communication network in accordance with a second embodiment of the present invention.

FIG. 7 is a flow chart 700 depicting operation of the input nodes 114 of the communication network in accordance with a second embodiment of the present invention. The second embodiment makes use of the end-to-end acknowledgment capability provided by the portable subscriber units 100. The flow chart 700 is similar to the flow chart 400, the essential difference being that the end-to-end acknowledgment verifies the integrity of the communication network all the way to the end recipient of the message.

In step 702 the input node 114 receives a message 210 from the PSTN and stores the message 210 in the memory 202. In response, the processor 204 controls the communication interface 206 to transmit 704 the message 210 via a first transmission path of the communication network, e.g., through a first CP node 112, to the portable subscriber unit 100. In addition, the processor 204 starts 706 the timer 208. Next, the processor 204 loops between steps 708 and 710 to determine whether an end-to-end acknowledgment from the portable subscriber unit 100 is received before the timer 208 reaches a predetermined time limit. If the end-to-end acknowledgment is received before the timer 208 reaches the limit, then the processor 204 removes 712 the message 210 from the memory 202. If, on the other hand, the timer 208 reaches the limit before the end-to-end acknowledgment is received, then the processor 204 retransmits 714 the message 210 via a second transmission path of the communication network, e.g., through a second CP node 112, and restarts 720 the timer 208. Next, the processor 204 loops between steps 716 and 722 to determine whether the end-to-end acknowledgment from the portable subscriber unit 100 is received before the timer 208 reaches a predetermined time limit. If the end-to-end acknowledgment is received before the timer 208 reaches the limit, then the processor 204 removes 712 the message 210 from the memory 202. If, on the other hand, the timer 208 reaches the limit before the end-to-end acknowledgment is received, then the processor 204 gives up 718, or alternatively, can reschedule a retry for a later time. By performing as described above, the input nodes 114 advantageously function to prevent the message 210 from being lost in the event of a failure of a critical portion of an entire path through the communication network to the portable subscriber unit 100 to which the message 210 has been sent.

By giving the input node 114 the responsibility of insuring the message delivery by retaining the message in the input node until receiving an acknowledgment of message delivery, the present invention advantageously provides redundancy in the communication network without the problems that have accompanied prior art approaches. The present invention advantageously does not require duplicate, synchronized databases in each of the essential elements of the network; does not require redundancy switching and complex software therefor; and does not place an extraordinary load on the communication channels carrying the data between the input nodes and the output nodes, as have the prior art approaches to redundancy.

What is claimed is:

1. A method for providing redundancy in a communication network comprising a plurality of nodes, the method comprising at a first node the steps of:

receiving and storing a message in a first memory;

transmitting the message to a first one of a plurality of second nodes; and removing the message from the first memory, in response to receiving an acknowledgment from the first one of the plurality of second nodes, the method further comprising at the first one of the plurality of second nodes the steps of:

receiving and storing the message within a second memory;

storing the message within a third memory accessible to the plurality of second nodes; and transmitting the acknowledgment to the first node, in response to storing the message in both the second and third memories.

2. The method of claim 1, further comprising in the first node the steps of:

starting a timer in response to transmitting the message to the first one of the plurality of second nodes; and retransmitting the message to a second one of the plurality of second nodes, in response to the timer exceeding a predetermined time limit and the acknowledgment having not been received.

3. The method of claim 1, further comprising at the first one of the plurality of second nodes the step of transmitting the message to a third node, in response to the first one of the plurality of second nodes remaining operational after transmitting the acknowledgment.

4. The method of claim 1, further comprising at the first one of the plurality of second nodes the step of removing the message from the second and third memories in response to having successfully communicated the message to a third node.

5. The method of claim 1, further comprising at a second one of the plurality of second nodes the steps of:

accessing the third memory to retrieve the message in response to the first one of the plurality of second nodes becoming non-operational after transmitting the acknowledgment to the first node and before removing the message from the second and third memories; and then transmitting the message to a third node.

6. The method of claim 1, wherein the communication network is a selective call radio communication system.

7. A communication network having a plurality of nodes for providing redundancy, the communication network comprising a first node for receiving and storing a message, the first node comprising:
a first communication interface for receiving the message and for transmitting the message to a first one of a plurality of second nodes;
a first memory coupled to the first communication interface for storing the message; and
a first processor coupled to the first memory and coupled to the first communication interface for removing the message from the first memory, in response to receiving by the first communication interface an acknowledgment from the first one of the plurality of second nodes, wherein the communication network further comprises
the first one of the plurality of second nodes, comprising:
a second communication interface coupled to the first communication interface for receiving the message;
a second memory coupled to the second communication interface for storing the message; and
a second processor coupled to the second communication interface for transmitting the acknowledgment to the first node, in response to storing the message both in the second memory and in a third memory, and wherein the communication network further comprises
the third memory coupled to the plurality of second nodes for storing the message.

8. The communication network of claim 7, wherein the first node further comprises a timer coupled to the first processor for timing the acknowledgment, and wherein the first processor is programmed to:
start the timer in response to transmitting the message to the first one of the plurality of second nodes; and
retransmit the message to a second one of the plurality of second nodes, in response to the timer exceeding a predetermined time limit and the acknowledgment having not been received.

9. The communication network of claim 7, wherein the second processor is programmed to transmit the message to a third node, in response to the first one of the plurality of second nodes remaining operational after transmitting the acknowledgment.

10. The communication network of claim 7, wherein the second processor is programmed to remove the message from the second and third memories in response to having successfully communicated the message to a third node.

11. The communication network of claim 7, further comprising a second one of the plurality of second nodes, comprising:
a third communication interface coupled to the first one of the plurality of second nodes for detecting an operational status indication from the first one of the plurality of second nodes; and
a third processor coupled to the third communication interface for accessing the third memory to retrieve the message in response to the first one of the plurality of second nodes becoming non-operational after transmitting the acknowledgment to the first node and before removing the message from the second and third memories, wherein the third processor is programmed to then transmit the message to a third node.

12. The communication network of claim 7, wherein the communication network is a selective call radio communication system.

* * * * *